April 13, 1954     T. W. SELL     2,674,902
LEVERAGE HAND BRAKE FOR VEHICLES
Filed Jan. 17, 1952     2 Sheets-Sheet 1
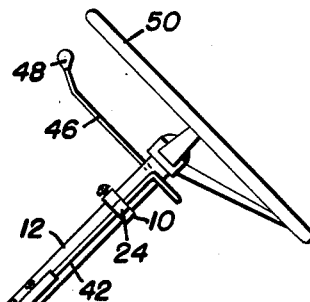
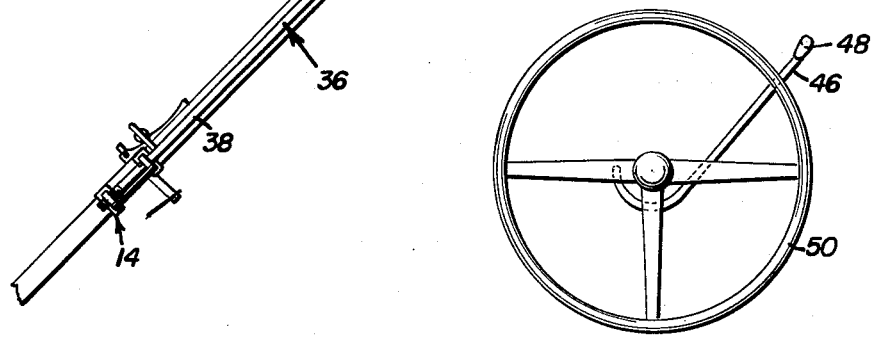
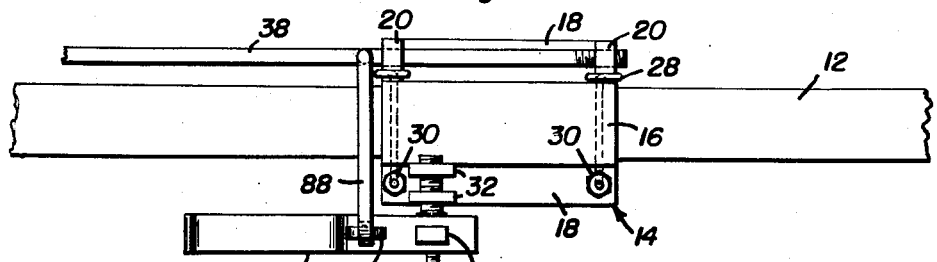
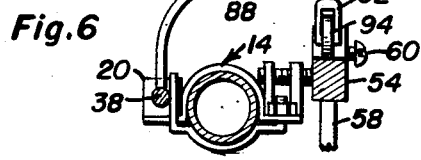
Theodore Waldemar Sell
INVENTOR.

April 13, 1954     T. W. SELL     2,674,902
LEVERAGE HAND BRAKE FOR VEHICLES
Filed Jan. 17, 1952     2 Sheets-Sheet 2
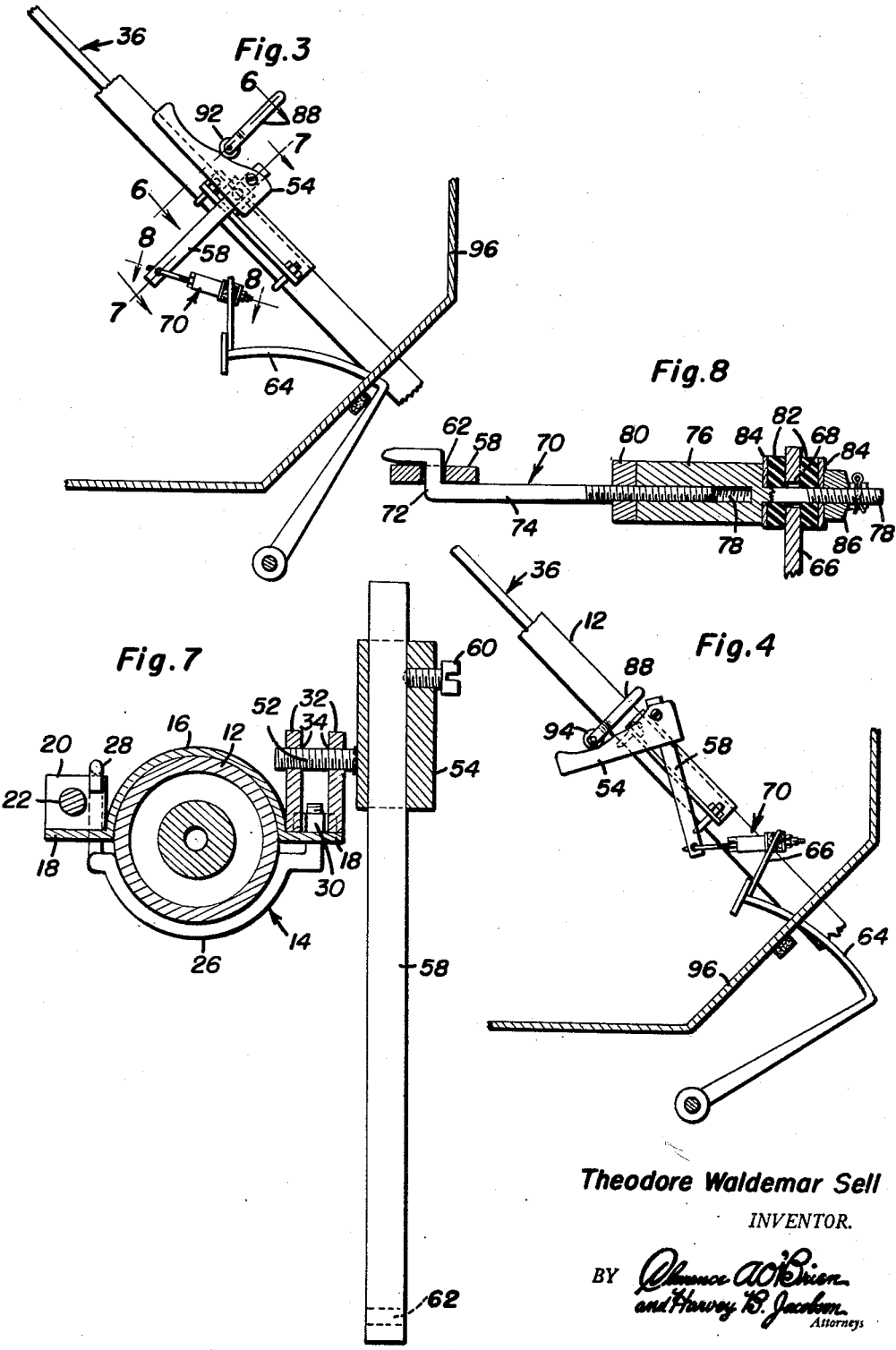
Theodore Waldemar Sell
INVENTOR.

Patented Apr. 13, 1954

2,674,902

UNITED STATES PATENT OFFICE 2,674,902

LEVERAGE HAND BRAKE FOR VEHICLES

Theodore Waldemar Sell, Casselton, N. Dak., assignor, by direct and mesne assignments, to Leverage Hand Brake Company, Fargo, N. Dak., a corporation Application January 17, 1952, Serial No. 266,867

8 Claims. (Cl. 74—484)

This invention relates generally to a hand brake for vehicles, and more specifically to a hand brake attachment for a foot brake pedal of a vehicle whereby the foot brake pedal may be actuated by a hand lever.

Due to every day accidents, and those which occured during the last wars, there are many people who wish to drive cars, but haven't sufficient strength in their right legs to apply pressure to a foot brake pedal to actuate brakes on a vehicle. At the present there are numerous attachments for vehicles whereby the foot brake pedal may be actuated by a hand lever, however, a majority of such attachments are cumbersome and in the way of an average driver who wishes to drive the vehicle with such attachment thereon. Furthermore, such attachments are especially designed for mounting only on one particular type of car.

The primary object of this invention is to provide an improved leverage hand brake for vehicles whereby the foot brake pedal may be actuated by a hand lever for applying the brakes of the vehicle.

Another object of this invention is to provide an improved leverage hand brake for vehicles which is mounted on the steering column of the vehicle with all of the linkage of the attachment being closely adjacent the steering column and above the foot brake pedal whereby the foot brake pedal may also be applied by force exerted thereupon by a foot.

Another object of this invention is to provide an improved leverage hand brake for vehicles which may be easily secured to a conventional vehicle without the use of special tools or machine work.

Another object of this invention is to provide an improved leverage hand brake for vehicles which is of simple construction and made of materials readily obtainable so that it may be economically manufactured.

Another object of this invention is to provide an improved leverage hand brake for vehicles whereby constant leverage may be applied to the foot brake pedal of the vehicle by a hand lever.

A further object of this invention is to provide an improved hand brake for actuating the foot brake pedal of vehicles, all of the linkage of the hand brake attachment being adjustable whereby the same attachment may be secured to a plurality of different makes of automobiles.

With these objects definitely in view, this invention resides in certain novel features of construction, combination and arrangement of elements and portions as will be hereinafter described in detail, in the specification, particularly pointed out in the appended claims, and illustrated in the accompanying drawings which form a material part of this application, and in which:

Figure 1 is a side elevational view of a steering column having secured thereto the leverage hand brake attachment for vehicles, which is the subject of this invention, the steering column being viewed from the left side of the vehicle to which it is attached;

Figure 2 is a view looking down the axis of the steering column and showing the relationship of a control arm for the attachment with respect to the steering wheel carried by the steering column;

Figure 3 is an enlarged partial side elevational view of the lower portion of a front of the driver's compartment of a vehicle, the floor board of the vehicle being shown in section, and showing the arrangement of the foot brake pedal with respect to the steering column, and showing the connection of the linkage of the hand brake attachment with respect to the steering column and the foot brake pedal;

Figure 4 is an enlarged partial side elevational view similar to Figure 3 showing the foot brake pedal in its depressed position;

Figure 5 is an enlarged partial top plan view of the steering column of Figures 1 through 4 and showing an elongated attaching bracket and the manner in which the elements of the hand brake attachment are mounted thereon;

Figure 6 is an enlarged partial transverse vertical sectional view taken substantially upon the plane indicated by the section line 6—6 of Figure 3 and showing the manner in which elements of the hand brake attachment are secured to the steering column by means of an elongated bracket;

Figure 7 is an enlarged partial transverse vertical sectional view taken substantially upon the plane indicated by the section line 7—7 of Figure 3 and showing the manner in which one of the links is pivotally secured to elongated attaching bracket;

Figure 8 is an enlarged longitudinal transverse sectional view taken substantially upon the plane indicated by the section line 8—8 and showing the construction of a second link and the manner in which it is attached to the first link and a plate carried by the foot brake pedal; and Figure 9 is an enlarged partial side elevational view of a portion of the operating lever for the hand brake attachment, a portion of the lever being broken away and shown in section in order to clearly illustrate the manner in which it is adjustably extended.

Similar characters of reference designate similar or identical elements and portions throughout the specification and throughout the different views of the drawings.

Referring now to the drawings in detail, this invention includes a first bracket 10 clamped to a steering column 12 adjacent its upper end, and an elongated second bracket 14 also clamped to the steering column 12, but adjacent its lower end. Referring now to Figures 5 and 7 in particular, it will be seen that the elongated bracket 14 includes an elongated plate 16 which has a semi-circular center portion and wing flanges 18 at right angles thereto. The left hand wing flange 18 has at its ends blocks 20 projecting upwardly vertically therefrom. The blocks 20 are provided with centrally located apertures 22. Carried by the upper bracket 10 is a sleeve portion 24 in alignment with the apertures 22. The plate portion 16 of the bracket 14 is secured to the steering column 12 by a pair of generally U-shaped bolts 26 having a hook 28 at one end and the other end being threaded. The hook end 28 is hooked over the upper edge of the block 20 and the threaded end is passed through an aperture in the right hand wing flange 18 and secured thereto in adjusted clamping position by a nut 30 threadedly engaged thereon. Carried by the right hand wing flange 18 adjacent its upper end is a pair of plates extending longitudinally thereof and normal thereto. The plates are referred to in general by the reference numeral 32 and are provided with transverse apertures in alignment therewith, said apertures being transverse of the steering column 12 and referred to in general by the reference numeral 34.

Referring now to Figures 1 and 9 in particular, it will be seen that mounted in the apertures 22 and the sleeve portion 24 is an operating lever 36. The operating lever 36 includes a lower shaft portion 38 which passes through the apertures 22 in the plates 20 and is threadedly secured in the lower plate 20 of the bracket 14. The upper end of the lower shaft portion 38 is provided with elongated central bore 40 in which is slidably mounted an upper shaft portion 42 of the operating lever 36. The shaft portion 42 is secured in adjusted relation to the shaft portion 38 by a pair of locking screws 44 threadedly received through the shaft portion 38 and engaging the shaft portion 42. The shaft portion 42 of the operating lever 36 is rotatably journaled within the sleeve portion 24 of the bracket 10. While the operating lever 36 is mounted on the left side of the steering column 12, its upper shaft portion 42 is curved around the upper portion of the steering column 12 and extends from the right hand side thereof in the form of an operating handle 46. The operating handle 46 is provided with the conventional knob 48 which extends outwardly of a steering wheel 50 secured to the upper end of the steering column 12. While the operating handle 46 is shown on the right hand side of the steering wheel 50, it is obvious that it may be bent in the opposite direction for a left-handed driver.

Threadedly secured within the apertures within the plates 32 for limited rotation is a threaded pin 52. The threaded pin 52 is secured to the left side of a crank arm 54 which normally extends parallel to the steering column 12. The crank arm 54 is provided with an opening 56, a rectangular cross-section therethrough, and a rectangular link 58 is slidably received therein. The link 58 is adjustably secured within the crank arm 54 by a lock screw 60 threadedly mounted thereon. The opposite end of the link 58 is provided with a transverse bore 62.

Referring now to Figures 3 and 8 in particular, it will be seen that secured to a foot brake pedal 64 and extending upwardly therefrom is a plate 66. The plate 66 is provided with an aperture 68 adjacent its upper end in which is received a link 70 of a diameter much smaller than the aperture 68. The link 70 is provided with a Z-shaped end 72 which locks within the bore 62 of the link 58. The link 70 is formed in two pieces and includes a shaft portion 74 of which the Z-shaped end is a portion and a socket portion 76 which has a shaft portion 78 extending from one end thereof. It is the shaft portion 78 which is secured in the aperture 68 of the plate 66. The socket portion 76 is provided with a central threaded bore 80 in which is threadedly engaged the threaded opposite end of the shaft 74. The shaft 74 is locked in its adjusted position within the threaded bore 78 by a lock nut 80 threadedly engaged thereon. Carried by the shaft portion 78 of the socket portion 76 are a pair of rubber pads 82 and washers 84. Each rubber pad 82 is engaged against opposite sides of the face plate 66 and the washers 84 engage the outer sides of the rubber pads 82. The plate 66 is retained on the shaft portion 78 of the socket member 76 by a lock nut 86 threadedly engaged thereon.

As is best illustrated in Figure 5, the operating lever 36 has welded to its lower shaft portion 38 adjacent the lower end thereof an L-shaped arm 88 which extends over and around the steering column 12 and is provided with a bifurcated end 92 in which is rotatably journaled a roller 94.

The roller 94 engages the upper surface of the crank arm 54 which is provided with a curved upper surface of such configuration that the effective lever arm of the roller 94 on the crank arm remains constant. In view of the foregoing, it is readily apparent that when the operating handle 46 is rotated in a clockwise direction, that the L-shaped arm 88 at the lower end of the operating lever 36 is also rotated clockwise with the roller associated therewith engaging the curved upper surface of the crank arm 54. This rotates the crank arm 54 in a counterclockwise direction as viewed in Figures 3 and 4, with result that the link 58 is pivoted in the pin 52 with its lower end moving toward the foot brake pedal 64. The link 70 is also moved toward the foot brake pedal 64 and its associated floor board 96. This results in the movement of the foot brake pedal 64 toward the floor board 96 and the application of the hydraulic brakes or whatever brake system is being actuated. The foot brake pedal is illustrated in its depressed position in Figure 4, which also shows the position of the linkage of the hand brake attachment when the foot brake pedal is in its depressed position.

The operation of this attachment will be understood from the foregoing description of the mechanical details thereof, taken in connection with the above recited objects and the drawings. Further description would appear to be unnecessary.

Minor modification of the attachment, varying in minor detail from the embodiment of that attachment illustrated and described here, may be resorted to without departure from the spirit and the scope of this invention, as defined in the appended claims.

Having described the invention, what is claimed as new is:

1. An attachment for hand operation of a foot brake pedal, said attachment comprising an operating lever adapted to be secured to a fixed steering column, a first link adapted to be pivotally connected to said column, a second link adapted to be pivotally connected to a brake pedal, said first and second links being pivotally connected together, said first link having a crank arm rigidly secured thereto, a roller carried by said operating lever engaging said crank arm.

2. An attachment for hand operation of a foot brake pedal, said attachment comprising an operating lever adapted to be secured to a fixed steering column, a first link adapted to be pivotally connected to said column, a second link adapted to be pivotally connected to a brake pedal, said first and second links being pivotally connected together, said first link having a crank arm rigidly secured thereto, a roller carried by said operating lever engaging said crank arm, said crank arm having a curved roller engageable surface whereby the lever arm of the force exerted by said roller on said crank arm remains constant, and the mechanical advantage of said crank arm is increased.

3. An attachment for hand operation of a foot brake pedal, said attachment comprising an operating lever adapted to be secured to a fixed steering column, a first link adapted to be pivotally connected to said column and operatively engaged by said operating lever, a second link adapted to be pivotally connected to a brake pedal, said first and second links being pivotally connected together, said second link being provided with a plate for attachment to a brake pedal, said plate having an enlarged aperture therein, one end of said second link being mounted through said aperture, resilient pads on said second link engaging opposite sides of said plate whereby limited pivoting between said second link and said plate is permitted, stop means on said one end engaging said resilient pads and limiting movement thereof with respect to said one end.

4. In combination with an automobile, an attachment for hand operation of a foot brake pedal, said automobile having a fixed steering column and a foot brake pedal, an operating lever carried by said steering column, a first link pivotally carried by said steering column, a second link pivotally mounted on the foot brake pedal, said first and second links being pivotally connected together, said first link having a crank arm rigidly secured thereto, a roller carried by said operating lever engaging said crank arm.

5. In combination with an automobile, an attachment for hand operation of a foot brake pedal, said automobile having a fixed steering column and a foot brake pedal, an operating lever carried by said steering column, a first link pivotally carried by said steering column, a second link pivotally mounted on the foot brake pedal, said first and second links being pivotally connected together, said first link having a crank arm rigidly secured thereto, a roller carried by said operating lever engaging said crank arm, said crank arm having a curved roller engageable surface whereby the lever arm of the force exerted by said roller on said crank arm remains constant and the force advantage of the operating lever is increased.

6. In combination with an automobile, an attachment for hand operation of a foot brake pedal, said automobile having a fixed steering column and a foot brake pedal, an operating lever carried by said steering column, a first link pivotally carried by said steering column and operatively engaged by said operating lever, a second link pivotally mounted on the foot brake pedal, said first and second links being pivotally connected together, said second link being provided with a plate attached to the brake pedal, said plate having an enlarged aperture therein, one end of said second link being mounted through said aperture, resilient pads on said second link engaging opposite sides of said plate whereby limited pivoting between said second link and said plate is permitted, stop means on said one end engaging said resilient pads and limiting movement thereof with respect to said one end.

7. For use with a vehicle having a fixed steering column and a foot brake pedal, an attachment for hand operation of a foot brake pedal, said attachment comprising an operating lever including an elongated shaft having mounting brakets adjacent its upper and lower ends for attachment to a steering column, an operating handle at the upper end of said shaft, an actuating arm at the lower end of said shaft, a first link pivotally mounted on the lower end mounting bracket, said first link including a crank arm underlying a free end of said actuating arm and having a curved surface diverging outwardly from said free end, a roller on said free end engaging said curved surface whereby the lever arm of the force exerted by said roller remains constant and the force advantage of the operating lever is increased, a second link pivotally connected to said first link and adapted to be pivotally connected to a foot brake pedal.

8. For use with a vehicle having a fixed steering column and a foot brake pedal, an attachment for hand operation of a foot brake pedal, said attachment comprising an operating lever including an elongated shaft having mounting brackets adjacent its upper and lower ends for attachment to a steering column, an operating handle at the upper end of said shaft, an actuating arm at the lower end of said shaft, a first link pivotally mounted on the lower end of said mounting brackets, said first link including a crank arm underlying a free end of said actuating arm and having a curved surface diverging outwardly from said free end, a roller on said free end engaging said curved surface whereby the lever arm of the force exerted by said roller remains constant and the force advantage of the operating lever is increased, a second link pivotally connected to said first link and adapted to be pivotally connected to a foot brake pedal, said second link including a plate to be rigidly connected to a foot brake pedal, said plate having an enlarged aperture therein, one end of said second link being mounted through said aperture, resilient pads fixedly mounted on said second link engaging opposite sides of said plate whereby limited pivoting between said second link and said plate is permitted.

References Cited in the file of this patent

UNITED STATES PATENTS

| Number | Name | Date |
|---|---|---|
| 688,351 | Skidmore | Dec. 10, 1901 |
| 1,177,132 | Paepke | Mar. 28, 1916 |
| 1,521,517 | Fairbank | Dec. 30, 1924 |
| 1,537,477 | Levesque | May 12, 1925 |
| 1,548,725 | Manwaring | Aug. 4, 1925 |
| 1,608,992 | Peavy | Nov. 30, 1926 |
| 1,906,366 | Burns | May 2, 1933 |
| 1,939,221 | Nelson | Dec. 12, 1933 |
| 2,504,729 | Rajan | Apr. 18, 1950 |
| 2,537,222 | Horne | Jan. 9, 1951 |
| 2,599,656 | Ostrow | June 10, 1952 |

FOREIGN PATENTS

| Number | Country | Date |
|---|---|---|
| 513,292 | France | Oct. 29, 1920 |